United States Patent [19]
Hopf

[11] 4,122,608
[45] Oct. 31, 1978

[54] TUBE FEELER

[75] Inventor: Werner G. Hopf, Carpentersville, Ill.

[73] Assignee: Teledyne Industries, Inc., Los Angeles, Calif.

[21] Appl. No.: 790,053

[22] Filed: Apr. 22, 1977

[51] Int. Cl.² ............................................. G01B 7/00
[52] U.S. Cl. ............................ 33/174 L; 33/174 PC
[58] Field of Search ............ 33/1 M, 174 L, 174 PC, 33/174 N, 178 E; 235/151.3, 92 DN

[56] References Cited
U.S. PATENT DOCUMENTS 3,944,798  3/1976  Eaton ............................. 33/174 PC

FOREIGN PATENT DOCUMENTS 1,329,708  9/1973  United Kingdom .................. 33/174 N

*Primary Examiner*—Richard R. Stearns
*Attorney, Agent, or Firm*—Wegner, Stellman, McCord, Wiles & Wood

[57] ABSTRACT

An improved tube feeler for an instrument which measures the position of points along straight portions of a preformed tube, rod or pipe. The improved tube feeler is rotatably mounted on an offset end portion of the carrier of the instrument. A pair of movable plates having facing tube-engaging surfaces are mounted on a base for movement toward and away from each other to bring the tube-engaging surfaces into contact with opposite sides of the tube. When the tube-engaging surfaces of the pair of plates engage the surface of the tube, an intersection of the projections of a first and a second axis of the instrument intersect the centerline of the tube.

21 Claims, 5 Drawing Figures

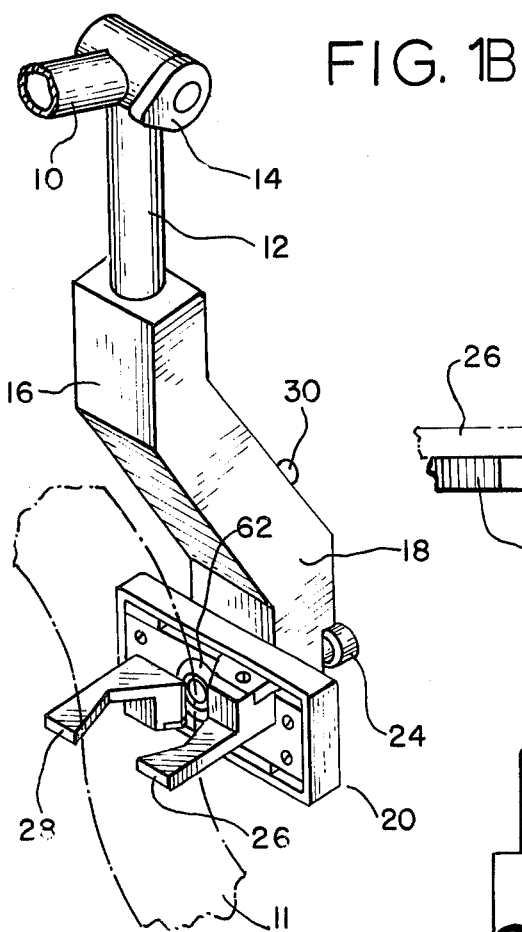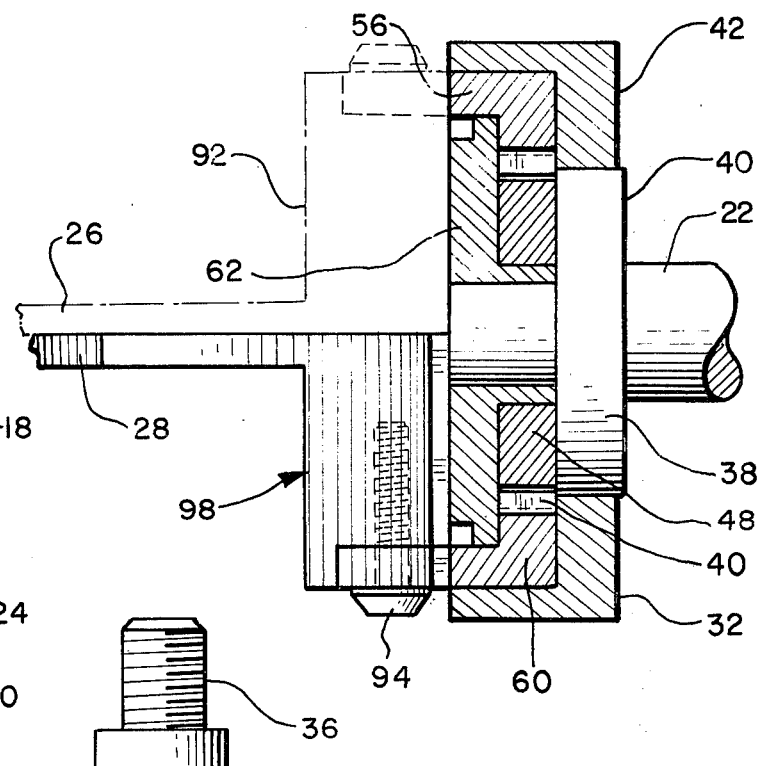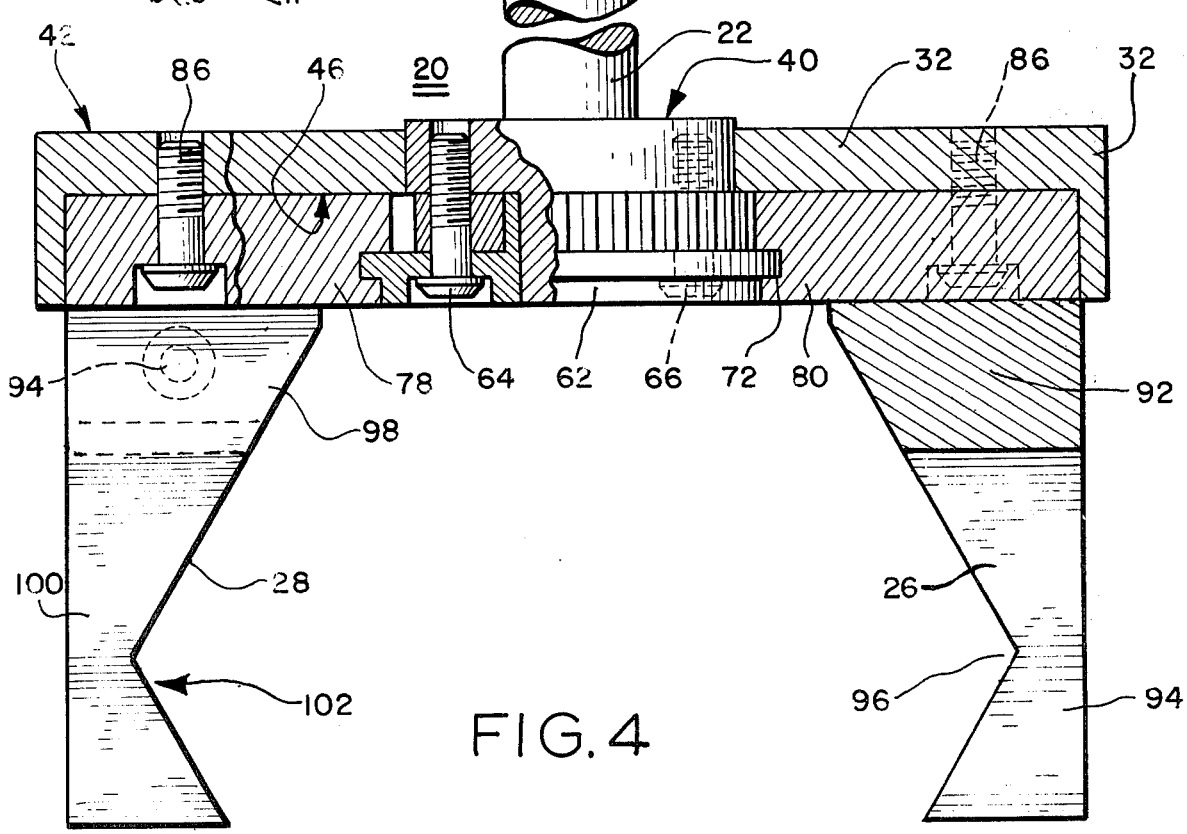

4,122,608

TUBE FEELER

RELATED APPLICATIONS

This application is related to copending application Ser. No. 753,603 filed Dec. 22, 1976.

BACKGROUND OF THE INVENTION

This invention relates to an improved tube feeler for an instrument which measures the position of various points of interest in a three-dimensional space and, more particularly, to a tube feeler which accommodates many different ranges of tube sizes.

The copending application describes an instrument for measuring the position of points along a straight portion of a preformed rod, tube or pipe hereinafter referred to as a tube. The measurements may be converted to vectors representing the straight portions and used to generate instructions to a bending machine for manufacturing a reproduction of the tube. A column is attached to a carrier which moves along one edge of a work table on which the tube is supported. The column has an upper end at which a first arm is provided for movement in a vertical plane. A second arm, having a carrier mounted at its end, is pivoted with respect to the first arm for further movement in the vertical plane. The carrier swivels about the axis of the second arm and has an offset end portion on which a tube feeler is mounted. The tube feeler has surfaces for engaging the preformed tube and is a single outwardly opening U-shaped member which accommodates a wide range of tube diameters. When the tube is engaged by the tube feeler, projections of the axis of the second arm and the axis of the tube feeler intersect at the centerline of the tube. Resolvers provide signals indicating the location of the carriage and the angles of the two arms, collectively defining the position of the intersection of the axis projections. The tube feeler, however, must be removed and replaced with a tube feeler of another size to accommodate various ranges of tube diameters.

I have developed an improved tube feeler which may be mounted on the offset end portion of an apparatus for measuring points along the straight portions of a preformed tube. The improved tube feeler is capable of accommodating various ranges of tube diameters. The improved tube feeler could also be used with other types of apparatus such as that disclosed by Eaton U.S. Pat. No. 3,944,798 or McMurtry British Pat. No. 1,329,708.

SUMMARY OF THE INVENTION

A base is rotatably mounted on an offset end portion of an apparatus for measuring the location of points along a preformed tube. A first and a second plate having tube-engaging surfaces which face each other project outwardly from the base for movement toward and away from each other to bring the tube-engaging surfaces into contact with opposite sides of the tube. When the tube-engaging surfaces are in contact with the opposite sides of the tube, an intersection of the projections of a first and a second axis lies on the centerline of the tube. Movement of the first and second plates is coordinated so that the second axis is always midway between the tube-engaging surfaces.

It is a feature of the present invention to provide an improved tube feeler which accommodates a wide range of tube sizes.

Another feature of the present invention is to provide an improved tube feeler which may be easily mounted on a variety of existing apparatus for measuring preformed tubes.

Yet another feature of the present invention is to provide a tube feeler having a rotatable base with adjustable plates projecting outwardly therefrom such that when the tube-engaging surfaces of the adjustable plates engage the tube, the intersection of a first and a second axis lies at the center of the tube.

Yet another feature of the present invention is to provide an improved tube feeler having two plates which are adjustable toward and away from each other, thereby accommodating a wide range of tube diameters.

Other features of the present invention will become apparent when considering the specification in combination with the drawing in which:

DRAWING

FIG. 1B is a perspective view of an offset end portion of the apparatus for measuring tubes having mounted thereon the improved tube feeler of the present invention;

FIG. 3 is a cross-sectional view of the tube feeler shown in FIG. 1B; and

FIG. 4 is yet another cross-sectional view of the tube feeler shown in FIG. 1B.

DESCRIPTION OF PREFERRED EMBODIMENT

Figure 1A:
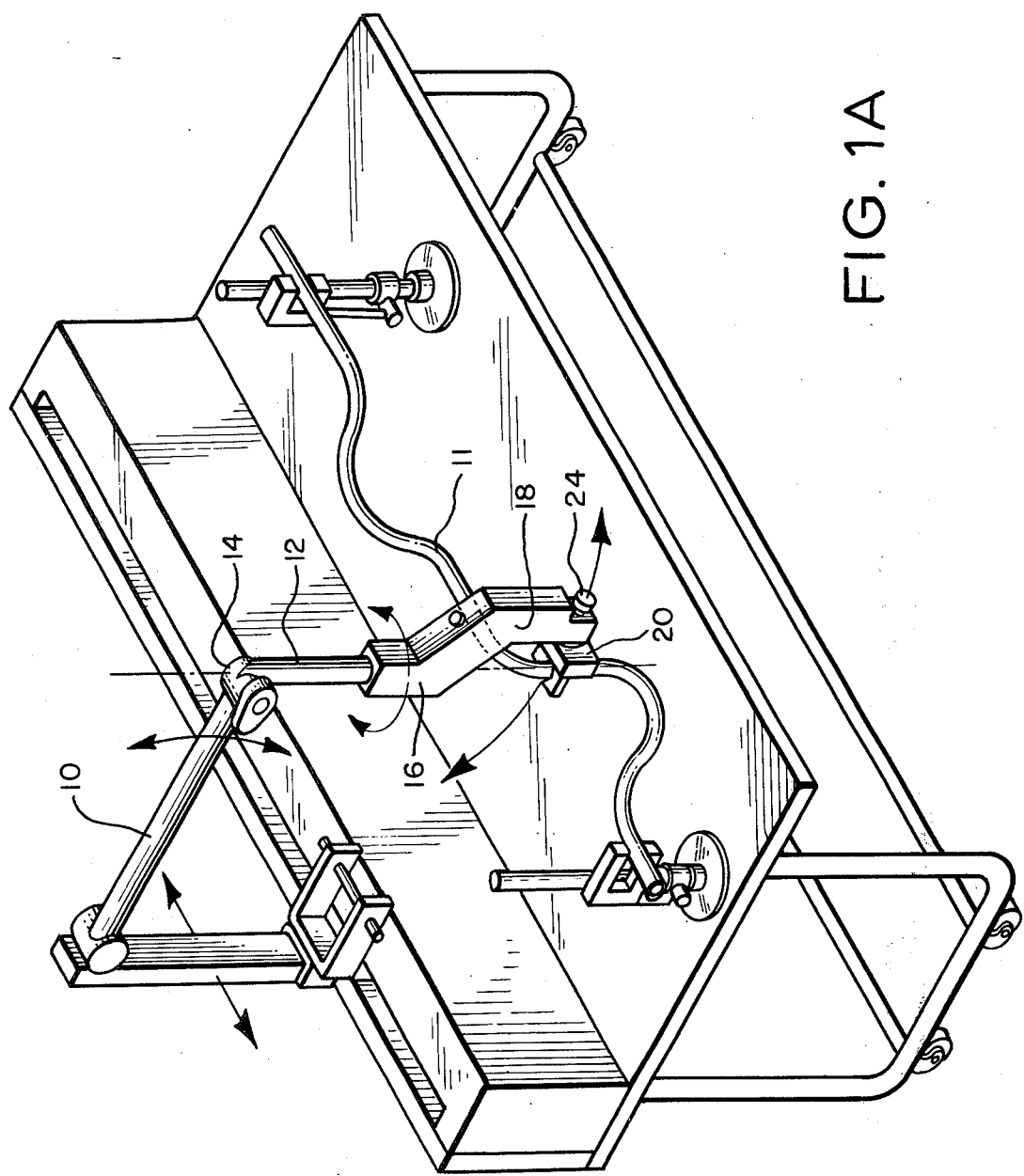
FIG. 1A is a perspective view of an apparatus for measuring tubes.

Referring to FIGS. 1A and 1B, pivoted arm 10 is coupled to a vertical column of an instrument for measuring points along a preformed tube 11. The instrument is more thoroughly described in the copending application. A second pivoted arm 12 is coupled to pivoted arm 10 through resolver 14 mounted at the pivot. Carrier 16 is mounted at the end of pivoted arm 12 so that it may swivel about its axis. Carrier 16 has an offset end portion 18 of sufficient depth and length to accommodate rotatable tube feeler 20.

Tube feeler 20 is mounted for rotation on carrier 16 by shaft 22 which extends through the carrier and is retained by knob 24. Rotation of knob 24 controls the angular position of the tube feeler 20 with respect to the carrier 16 as well as the position of plates 26 and 28 with respect to each other. As will appear in greater detail below, a projection of the axis of arm 12 intersects the axis of the tube feeler 20 and when the plates 26 and 28 engage opposite sides of the tube, the intersection of the axes is on the centerline of the tube. The outputs of the resolvers, as resolver 14, collectively define the location of the intersection and switch 30 is depressed to record the signals as described in the copending application. The signals are then used to develop a bending program to duplicate the preformed tube.

The engagement of tube feeler 20 with the tube to be measured will now be explained. A point of interest on a tube is selected and pivoted arms 10 and 12 are positioned near the point in the well known manner. Carrier 16 is rotated about pivoted arm 12 so that the tube feeler 20 faces the tube with plates 26 and 28 spaced apart. Knob 24 is then rotated and the carrier 16 is positioned such that the tube lies between plates 26 and 28. Base 32 of tube feeler 20 is manually restrained, while knob 24 is rotated further, thereby drawing plates 26 and 28 closer together. When plates 26 and 28 engage the opposite surface of the tube, the base 32 no longer needs to be manually restrained. As knob 24 is rotated even further, the plates tend to align themselves at right angles with the tube so that the edges of the plates lie flat against the opposing tube surfaces. When so engaged, the centerline of the tube is located at the intersection of the projection of the axis of arm 12 and tube feeler 20.

Figure 2:
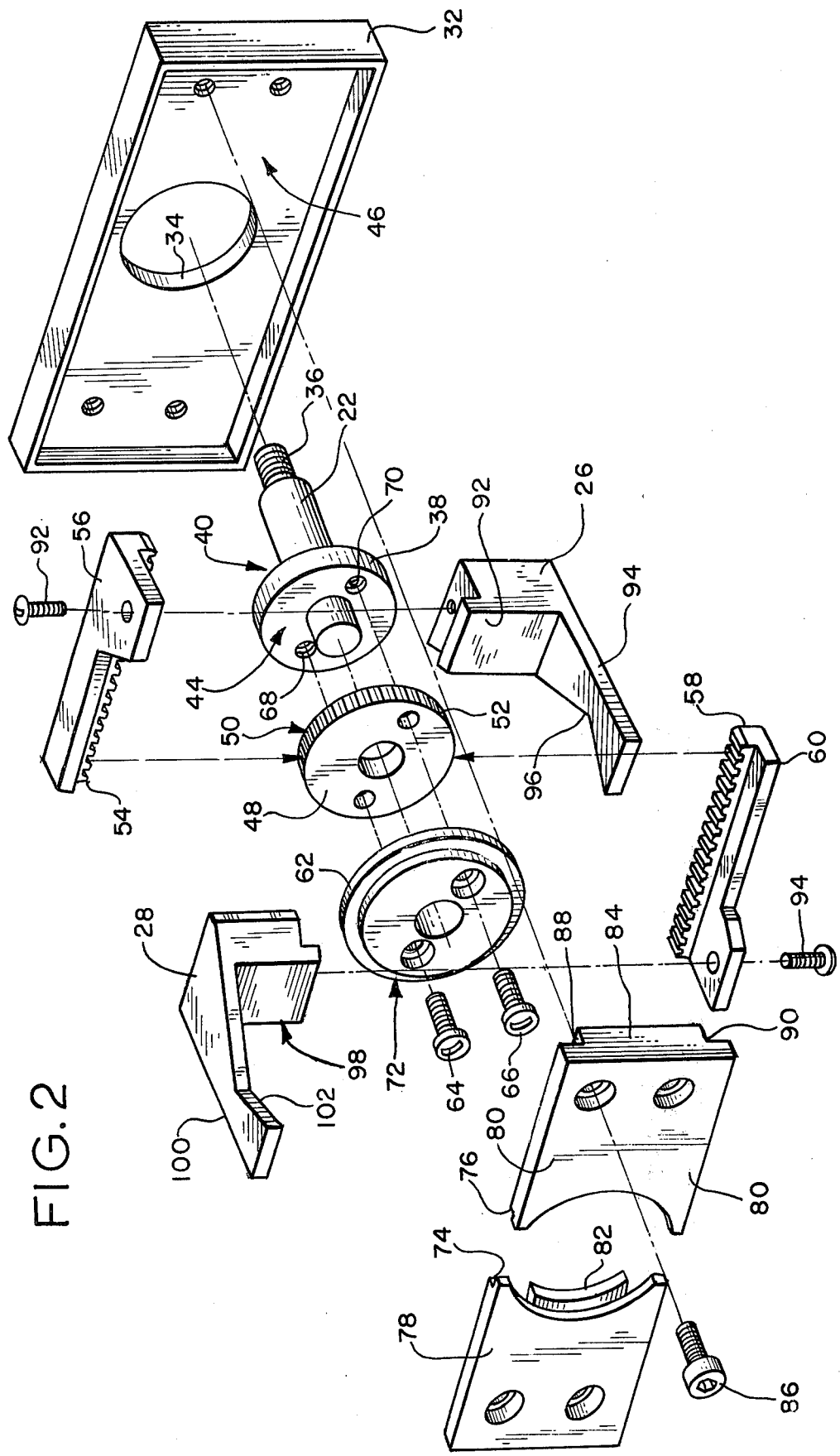
FIG. 2 is an exploded perspective view of the tube feeler.

Referring to FIGS. 2-4, shaft 22 projects through annular hole 34 and carrier 16. Knob 24 is attached to the shaft 22 by threads 36 on the opposite side of carrier 16. Disc 38 is mounted on shaft 22 so that its rear surface 40 extends outwardly, by a small amount, from the rear surface 42 of base 32. This small distance permits tube feeler 20 to rotate freely about carrier 16. The front surface 44 of disc 38 is coincident with the inner surface 46 of base 32. Spur gear 48 is mounted against the front surface 44 of disc 38. The diameter of the spur gear 48 is larger than the diameter of annular hole 34 so that its rear surface 50 is in engagement with inner surface 46 of base 32. Gear teeth 52, around the perimeter of spur gear 48, receive gear teeth 54 on rack 56 and gear teeth 58 on rack 60. The motion of spur gear 48 with respect to racks 56 and 60 will be explained in greater detail below. Ring clamp 62 secures spur gear 48 to front surface 44 of disc 38 by screws 64 and 66 received in threaded bores 68 and 70. Also, it should be noted that shaft 22, which projects outwardly from the front surface 44 of disc 38 may be used for alignment purposes of spur gear 48 and ring clamp 62 to assure that they are concentric with the axis of shaft 22. Ring clamp 62 has an outwardly extending bevel 72 around its perimeter. The bevel 72 is received in arcuate grooves 74 and 76 of retaining plates 78 and 80, respectively. Retaining plates 78 and 80 each have a spacer, 82 and 84, respectively. The spacer may be integrally formed with the retaining plate or may be a separate part. Retaining plates 78 and 80 are secured to surface 46 of base 32 by screws, as screw 86. When so secured to the base 32, an upper channel 88 and a lower channel 90 are formed thereby. The channels 88 and 90 are of sufficient width to accommodate gear teeth 54 and 58 on racks 56 and 60, respectively. The racks slide in their respective channels 88 and 90 in opposite directions as spur gear 48 rotates.

Plates 26 and 28 are coupled to rack 56 and 60 by screws 92 and 94, respectively. Plate 26 has a shank 92 and projecting therefrom is a finger 94 having a V-shaped recess 96. Similarly, plate 28 has a shank 98 and finger 100 having a V-shaped recess 102. V-shaped recesses 96 and 102 face each other. The length of shank 92 and the length of shank 98 are selected such that fingers 94 and 100 do not interfere with each other when plates 26 and 28 are drawn together, as best seen in FIG. 3.

Fingers 94 and 100 must be sufficiently long to accommodate a wide range of tube diameters and the vertices of V-shaped recesses 96 and 102 are positioned such that a line drawn between them is perpendicular to the projection of the axis of shaft 22. Although the particular angle of the V-shaped recess is not required, an angle of 120° is preferable. Also, the angle of V-shaped recess 96 must be equal to the angle of V-shaped recess 102.

I claim:

1. In an apparatus for measuring a location of a point along straight portions of a preformed tube or pipe, said apparatus including means for mounting a tube in a known position, a member, means for positioning said member with respect to said tube, and means for sensing the position of said member, the improvement comprising: a tube feeler for acquiring the location of the point having a base mounted on said member;
   a pair of plates having tube-engaging surfaces; and
   means mounting said plates on said base for movement toward and away from each other to bring said tube-engaging surfaces into contact with opposite sides of said tube, said base and plates being so related to each other that the engagement of said surfaces with the tube causes the center-line of the tube to lie at a known location with respect to the position of the base to acquire the point to be measured.

2. The apparatus of claim 1 wherein the tube feeler has means defining a first and a second axis, which axes intersect, said intersection lying at the centerline of the tube when the tube-engaging surfaces contact opposite sides of the tube.

3. The apparatus of claim 2 wherein the tube feeler is mounted on said member for rotation about the first axis.

4. The apparatus of claim 2 wherein said means mounting said plates further includes:
   means for coordinating the movement of the pair of plates so that the intersection of the axes is always midway between tube-engaging surfaces.

5. The apparatus of claim 2 wherein said means mounting said plates further includes:
   a spur gear mounted for rotation in the base; and
   rack means mounted on the plates and engageable with the spur gear so that rotation of the spur gear relative to the rack means causes the plates to move.

6. In an apparatus for measuring the location of points along the straight portions of a preformed tube or pipe, said apparatus having a tube feeler defining a first and a second axis wherein projections of the first and second axes intersect, and means for positioning said tube feeler such that said intersection is positioned on the centerline of the tube, thereby acquiring each point to be measured, the improvement comprising: said tube feeler having a base coupled to said means for positioning said tube feeler;
   a pair of plates having facing tube-engaging surfaces; and
   means mounting said plates on said base for movement toward and away from each other to bring said tube-engaging surfaces into contact with opposite sides of said tube so that the engagement of said surfaces with the tube positions the intersection of the axes on the centerline of the tube.

7. The tube feeler of claim 6 wherein said base is rotatably mounted on said positioning means and is coupled to means for rotating the tube feeler base.

8. The tube feeler of claim 6 wherein the tube-engaging surfaces are V-shaped recesses in the pair of plates.

9. The tube feeler of claim 8 wherein a line drawn between the vertices of the V-shaped recesses intersects the intersection of the projection of the axes.

10. The tube feeler of claim 6 wherein said means mounting said plates on said base include:
   means mounted in said base for coordinating the movement of the pair of plates so that the intersection of the axes is always midway between the tube-engaging surfaces.

11. The tube feeler of claim 10 further including:
a spur gear mounted for rotation in the base; and
rack means mounted on the plates and engageable with the spur gear so that rotation of the spur gear relative to the rack means causes the plates to move.

12. The tube feeler of claim 11 wherein the spur gear is so positioned with respect to the rack means that rotation of the spur gear relative to the rack means causes the plates to move in equal and opposite directions.

13. The tube feeler of claim 6 further including:
means coupled to said means for positioning an intersection for rotating the base about the second axis;
a spur gear mounted on said means for rotating the base; and
rack means mounting the pair of plates and engaged with the spur gear so that rotation of the spur gear either causes the tube feeler to rotate about the second axis or causes the pair of plates to move toward or away from each other and from the second axis.

14. The tube feeler of claim 7 further including:
means responsive to the rotating means for coordinating the movement of the pair of plates so that the intersection of the axes is always midway between the tube-engaging surfaces.

15. The tube feeler of claim 6 wherein the base has a generally flat surface and the pair of plates is mounted perpendicular to the flat surface of the base.

16. In an instrument for measuring the location of points along straight portions of a preformed tube, the instrument having carriage means for providing linear movement along a work surface, a first arm having a first end and a second end, the first end of the first arm pivoted to the carriage means for pivotal movement thereabout, a second arm having a first end and a second end, the first end of the second arm pivoted at the second end of the first arm for pivotal movement thereabout, a carrier defining an axis parallel to the axis of the second arm, said carrier mounted on said second arm to swivel about the second arm and having an end portion offset from the axis of the second arm, the improvement comprising:
a tube feeler defining an axis and mounted on the offset end portion of the carrier and adapted to engage the surface of a tube, the tube feeler including a base, a pair of spaced-apart plates having facing tube-engaging surfaces, means adjustably mounting said plates on the base such that the distance between the plates varies in such a manner that a projection of the axis of the tube feeler intersects a projection of the axis of the second arm at the centerline of the tube to be measured when the pair of plates is in engagement with the tube surface.

17. The tube feeler of claim 16 wherein the tube feeler is rotatably mounted on the offset end portion of the carrier.

18. The tube feeler of claim 16 wherein the axis of the tube feeler is perpendicular to the axis of the second arm.

19. The tube feeler of claim 16 wherein the tube feeler includes facing V-shaped recesses on the pair of plates.

20. The tube feeler of claim 16 wherein a shaft having an axis is attached to the base plate and mounted for rotation in said offset end portion, the axis of the shaft being coincident with the axis of the tube feeler, said shaft providing for rotation of the tube feeler.

21. The tube feeler of claim 20 wherein the shaft projects through the carrier and a knob is mounted on the shaft on the side of the carrier opposite the tube feeler.

* * * * *